2,885,457
PROCESS FOR ISOMERIZATION OF NON-VULCANIZED RUBBER IN ABSENCE OF WATER AND OXYGEN

Herbert Bartl, Koln-Stammheim, Germany, assignor to Farbenfabriken Bayer Aktiengesellschaft, Leverkusen, Germany, a corporation of Germany No Drawing. Application November 30, 1954
Serial No. 472,207

Claims priority, application Germany December 3, 1953

8 Claims. (Cl. 260—769)

This invention relates to a process for the preparation of cyclized (isomerized) rubber and to the products produced by this process.

It is well known, that cyclized (isomerized) rubber can be obtained by milling or kneading rubber, in the form of sheet, crepe or reclaimed rubber with so-called cyclizing or isomerizing agents and heating the mixture. Cyclized rubber has furthermore been prepared by dissolving rubber in a solvent and heating the solutions in the presence of cyclizing agents. Due to the high viscosity of the rubber solutions the latter process can only be carried out with solutions of low concentrations. The rubber can furthermore be isomerized by means of boiling phenols. The products obtained by these processes, however, suffer from the drawback, that they are not well soluble in gasoline or that their solutions have too high a viscosity or that they are dark colored. For producing light colored lacquer solutions colorless cyclized rubbers are required which moreover meet all demands as regards fastness to light, elasticity and viscosity.

It is an object of the present invention to provide a process for the production of a cyclized rubber which is nearly colorless and which is well suited for the preparation of lacquer solutions. It is a further object of the present invention to provide a process for the production of cyclized rubber which can be carried out much faster than the hitherto known process. Further objects will become apparent from the description following hereafter.

It has been found that rubber can be cyclized or isomerized by treating it at temperatures between about 70 and 150° C. with a rubber solvent containing a cyclizing agent whereby the rubber is applied in such a quantity that it amounts to more than 10% of the solvent. In carrying out this process the isomerization of the rubber should take place more quickly than its dissolution or swelling, whereby the formation of solutions of high viscosity or the formation of swollen masses of rubber is prevented.

This object is obtained by bringing the mixture containing rubber, rubber solvents and active cyclizing agent as quickly as possible to temperatures above 70° C. If lower temperatures are used or if the temperature of above 70° C. is reached too slowly the rubber swells too strongly, whereby the isomerization takes place incompletely, so that products of high viscosity and low softening point are formed, which are not well suited for the production of lacquer solutions. If on the other hand the temperature is raised above 150° C. cross-linked insoluble products are formed. For these reasons only temperatures between 70° C. and 150° C. are suited for carrying out the process of the present invention. Moreover, it has been found that even in this range of temperature the formation of insoluble products is prevented only if oxygen is excluded from the reaction mixture. In order to impart to the conversion products a good compatibility with drying oils such as linseed oil, stand oils and other components such as alkyd resins it has been found to be advantageous to carry out the isomerization in the presence of phenols. For this purpose phenol, and substituted phenols such as cresols, xylenols or naphthols may be used. These phenols are preferably applied in quantities amounting to 10–50% calculated on the weight of rubber. However, greater quantities are also workable.

According to one embodiment of the present invention the reaction temperature should be reached quickly. The time required of course depends on the size of the charge. It has been found that the time required for reaching a temperature of 70° C. in the reaction mixture should generally not surpass 30 minutes. In this connection it is of advantage to apply the rubber in quantities that rather concentrated solutions of cyclized rubber are obtained. Since the reaction is exothermic the heat of reaction accelerates the isomerization to such a degree as to heat the reaction vessel to about 80° C. for starting the reaction, whereafter the reaction temperature rises without further external heating while the reaction proceeds smoothly until dissolution and isomerization of the rubber is completed. The rubber is applied in such quantities that the solutions obtained contain more than 10% preferably 20–50% of cyclized rubber. Isomerization and dissolution of the rubber take place within a few hours. When using appropriate reaction conditions the reaction may be complete within one hour. The reaction mixture should be agitated to maintain a uniform temperature throughout as soon as the mixture becomes mobile.

Suitable starting materials according to the invention are all kinds of raw rubber, such as pale crepe and smoked sheets, furthermore masticated rubber or rubber pretreated by any conventional method. As solvents may be employed practically all the known rubber solvents, for instance aliphatic and aromatic hydrocarbons and chlorohydrocarbons, such as gasoline, toluene, xylene, carbontetrachloride, tetrachloroethane, chlorobenzene. Suitable isomerizing agents are the usual cyclicizing or isomerizing agents of which the active ones are preferred. Particularly suitable for this purpose are anhydrous strong acids as for instance sulfuric acids, hydrogen chloride, organic sulfonic acids or sulfohalogenides, such as p-toluenesulfonic acid, phenolsulfonic acid, naphthalenesulfonic acid, p-toluenesulfochloride, furthermore the Friedel-Crafts catalysts. Typical examples of Friedel-Crafts catalysts useful to the invention are titanium tetrachloride, aluminiumchloride, tintetrachloride, boron trifluoride and addition compounds thereof as for instance with acetic acid or phenols. The amount of the cyclicizing or isomerizing agents depends upon the properties required. In general, quantities of about 3–25% as compared with the weight of rubber applied suffice to bring about the desired effect.

Suitable gases for excluding oxygen from the reaction mixture are $CO_2$ or $N_2$. The process of the present invention may also be carried out in a reducing atmosphere as for instance under hydrogen or $SO_2$.

Solid cyclized rubber can be recovered from the solutions by known methods as for instance by precipitation with a precipitating agent such as methanol, acetone or in some instances water or by steam distillation of the solvent. The cyclized rubber prepared by precipitation by means of acetone or methanol is a light colored powder, the solutions of which may have a light brown color.

In order to remove this stain the isolated cyclized rubber may be treated with small amounts of inorganic or organic basic compounds such as alkali hydroxides, alkalicarbonates, oxides, hydroxides or carbonates of alkali metals, ammonia, primary, secondary or tertiary amines, heterocyclic bases as for instance pyridine, piperidine or morpholine. These compounds are applied in such quantities that they suffice to neutralize the acids contained in the isolated products. This aftertreatment is preferably carried through in such a manner that the isolated product is covered with methanol or a similar solvent, which contains at least one of the aforementioned compounds. However, these compounds may also be added to the solutions prepared from the isolated products.

Apart from the advantages of the new process which makes it possible to prepare highly concentrated solutions of isomerization products from non-pretreated rubber in a technically simple manner, the rubber isomers obtained in accordance with the invention possess valuable properties making them useful for a wide field of application. As compared with the products prepared from rubber solutions the isomers obtained according to the invention have a lower viscosity which is of importance in the large scale manufacture of lacquer or varnish solutions. Moreover, the rubber derivatives obtained according to the invention exhibit extraordinarily good film forming properties and an excellent stability to acids and alkalies. They are further distinguished by good adhesion to glass, porcelain, paper and metal, which properties render the isomers excellently suitable as adhesives. Another field of application is the printing process. The mechanical properties of natural rubber can be substantially improved by incorporating therewith the rubber isomers obtained according to the invention.

In addition to being useful base materials for coatings and varnishes or lacquers, the solutions or products obtained by the herein described process may be employed in a wide variety of chemical reactions, for instance in chlorination processes.

The invention is illustrated by the following examples, without restricting it thereto, the parts given are by weight if not otherwise stated.

*Example 1*

From a reaction vessel equipped with a mechanical stirrer and containing 100 parts of crepe the air is removed by means of $CO_2$ gas. Thereafter 200 parts by volume of toluene and 12 parts of boronfluoride acetic acid are added. The mixture is heated to 130° C. After a few minutes the mixture is mobile, after one hour the reaction is completed. The homogeneous solution obtained is diluted with 200 parts by volume of toluene and precipitated with acetone. The cyclized rubber is a resinous substance which easily dissolves in gasoline to give a solution of low viscosity, from which lacquer films of good light-fastness can be prepared.

*Example 2*

A reaction vessel equipped with a mechanical stirrer, and containing 100 parts of crepe is evacuated and filled with nitrogen. 300 parts by volume of tetrachloroethane, 10 parts of concentrated sulfuric acid and 50 parts of phenol are heated to 100° C. and introduced into the reaction vessel which is also heated to 100° C. The reaction starts immediately with evolution of heat. After the main reaction the external temperature is raised to 110° C. After 2 hours the homogenous solution obtained is diluted with 100 parts of tetrachloroethane. The isomerized product is precipitated with methanol and filtered off. It is covered with methanol, containing 3 parts of pyridine and stirred for a short time. The product is filtered off once more and dried under vacuum. The dried substance dissolves easily in gasoline to give solutions of low viscosity. It is compatible with drying oils and forms hard, colorless films.

*Example 3*

Into a reaction vessel fitted with a stirrer which is filled with $CO_2$ there are given 100 parts of crepe and a solution consisting of 300 parts by volume of carbontetrachloride, 50 parts of phenol and 20 parts of p-toluenesulfonic acid, said solution being heated to 70° C. The mixture is heated to 78° C. After 5-6 hours the solvent is removed by steam distillation. The product obtained is easily soluble in gasoline, it is compatible with drying oils and forms colorless films.

What I claim is:

1. A process for the isomerization of non-vulcanized rubber which comprises mixing undissolved non-vulcanized rubber under substantial exclusion of oxygen and water with an acid isomerizing agent and a rubber solvent, and heating said reaction mixture to a temperature of 70–150° C. to produce a solution of cyclized rubber, the rubber solvent being applied in such a quantity that the solution obtained contains about 20–50% of cyclized rubber.

2. Process of claim 1 wherein the acid isomerizing agent is present in the reaction mixture in an amount of 3–25% by weight, based on the weight of the rubber.

3. Process according to claim 1, wherein the isomerization is conducted in the presence of a phenol, the latter being applied in a quantity smaller than that of non-vulcanized rubber.

4. A process for the isomerization of non-vulcanized rubber which comprises mixing undissolved non-vulcanized rubber under substantial exclusion of oxygen and water with an acid isomerizing agent and a rubber solvent, and heating said reaction mixture to a temperature of 70–150° C. to produce a solution of cyclized rubber, the rubber solvent being applied in such a quantity that the solution obtained contains about 20–50% of cyclized rubber, the amount of the isomerizing agent being so chosen that isomerization of the rubber and dissolution of the isomerized rubber substantially takes place within, at most, two hours.

5. A process for the isomerization of non-vulcanized rubber which comprises mixing undissolved non-vulcanized rubber under substantial exclusion of oxygen and water with an acid isomerizing agent and a rubber solvent, bringing said reaction mixture to a temperature of at least 70° C. within, at most, 30 minutes and keeping at a temperature of 70–150° C. to produce a solution of cyclized rubber, the rubber solvent being applied in such a quantity that the solution obtained contains about 20–50% of cyclized rubber.

6. A process for the isomerization of non-vulcanized rubber which comprises mixing, with exclusion of water and free oxygen, 100 parts of crepe rubber, 200 parts of toluene, and about 10 parts of boron-fluoride-acetic acid isomerizing agent, heating the mixture to 130° C. for one hour, and at the end of that time recovering a homogeneous solution of vulcanized rubber.

7. A process for the isomerization of non-vulcanized rubber which comprises mixing, with exclusion of water and free oxygen, 100 parts of crepe rubber, 300 parts of tetrachloroethane, 10 parts of concentrated sulfuric acid, and 50 parts of phenol, heating the mixture to 100° C. whereupon the reaction begins immediately, then raising the temperature to 110° C. and maintaining it at this temperature for two hours, and at the end of this time recovering a homogeneous solution of cyclized rubber.

8. A process for the isomerization of non-vulcanized rubber which comprises mixing, with exclusion of water and free oxygen, 100 parts of crepe rubber, and a solution consisting of 300 parts of $CCl_4$, 50 parts of phenol and 20 parts of p-toluene sulfonic acid, heating the mixture to 78° C., and maintaining it at this temperature for several hours to form a solution of vulcanized rubber.

References Cited in the file of this patent

UNITED STATES PATENTS

| | | |
|---|---|---|
| 2,104,358 | Treboux | Jan. 4, 1938 |
| 2,230,359 | McKenzie | Feb. 4, 1941 |
| 2,311,770 | Morris | Feb. 23, 1943 |

FOREIGN PATENTS

| | | |
|---|---|---|
| 307,134 | Great Britain | Mar. 7, 1929 |